April 20, 1954  R. P. DICKINSON ET AL  2,675,686
COOLER WITH MEANS FOR CONTROLLING THE RATE OF HEAT EXCHANGE
Filed May 6, 1950

Robert P. Dickinson,
William E. Weber,
Inventors,
Haynes and Koenig,
Attorneys.

Patented Apr. 20, 1954

2,675,686

UNITED STATES PATENT OFFICE 2,675,686

COOLER WITH MEANS FOR CONTROLLING THE RATE OF HEAT EXCHANGE

Robert Parker Dickinson, Robertson, and William Edward Weber, St. Louis, Mo.; said Weber assignor to said Dickinson Application May 6, 1950, Serial No. 160,544

9 Claims. (Cl. 62—91.5)

1

This invention relates generally to coolers, and more particularly to liquid coolers utilizing solidified carbon dioxide for cooling and carbonating water in a beverage dispenser.

The principal object of the invention is the provision of an improved cooler of the general type comprising a container for a charge of a refrigerant, such as solidified carbon dioxide, adapted for refrigerating an adjacent medium such as a body of water, the cooler being so constructed as to provide for comparatively rapidly cooling the medium and also for maintaining the medium cold for a considerable period of time. In order to maintain the medium cold for a considerable period, it is necessary to reduce the rate of heat transfer from the medium to the refrigerant, so as to prevent the refrigerant from being used up too rapidly, at the same time insuring that there is some heat transfer to keep the medium cold.

In general, a cooler of this invention comprises a container of heat-conductive material for a charge of refrigerant, such as solidified carbon dioxide, adapted for cooling an adjacent medium, such as a body of liquid, with the refrigerant isolated from the liquid. At least part of the container is of double-walled construction providing a sealed chamber between inner and outer walls. Sealed in the chamber is a quantity of a normally liquid heat transfer agent which, under its sealed condition in the chamber, is adapted to vaporize at a temperature somewhat lower than the freezing point of the liquid to be cooled, but considerably higher than the temperature of the refrigerant. With this arrangement, when the container is charged with refrigerant and immersed in the liquid to be cooled, the transfer of heat from the liquid to the refrigerant is retarded in the double-walled part of the container to prevent the refrigerant in this part of the container from being used up too rapidly, without entirely preventing heat transfer so that the refrigerant in this part of the container is effective to maintain the liquid cold for a considerable period of time. Heat transfer in the double-walled part of the container occurs by transfer of heat from the liquid through the outer wall to the heat transfer agent, causing the latter to vaporize, and by transfer of heat from the vapor through the inner wall to the refrigerant causing the vapor to condense, this cycle continuing as long as the temperature of the liquid is above the temperature of vaporization of the heat transfer agent.

The cooler of this invention is particularly

2 useful in a beverage dispenser such as may be carried by a vendor of soft drinks for dispensing a carbonated beverage, using solidified carbon dioxide both as a refrigerant and as a source of gaseous carbon dioxide for carbonating purposes. According to a more specific phase of the invention, wherein the cooler is used in such a beverage dispenser, the latter comprises a pressure vessel and a container for solidified carbon dioxide in the pressure vessel constructed as described above. The pressure vessel is adapted to be filled with a ready-mixed beverage or with water to be carbonated and mixed by the drink with a beverage sirup. The refrigerant container is in communication with the vessel through a check valve which is adapted to open to permit flow of carbon dioxide gas from the refrigerant container to the vessel for carbonating and/or maintaining the contents of the vessel carbonated and to prevent flow of water from the vessel to the container. With the liquid cooler of this invention, such a dispenser is adapted to maintain the contents of the vessel cold for a considerable period of time, even on a hot day. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which one of various possible embodiments of the invention is illustrated, Fig. 1 is a view in elevation of a beverage dispenser embodying the invention;

Similar reference characters indicate corresponding parts throughout the several views of the drawing.

Figure 1:
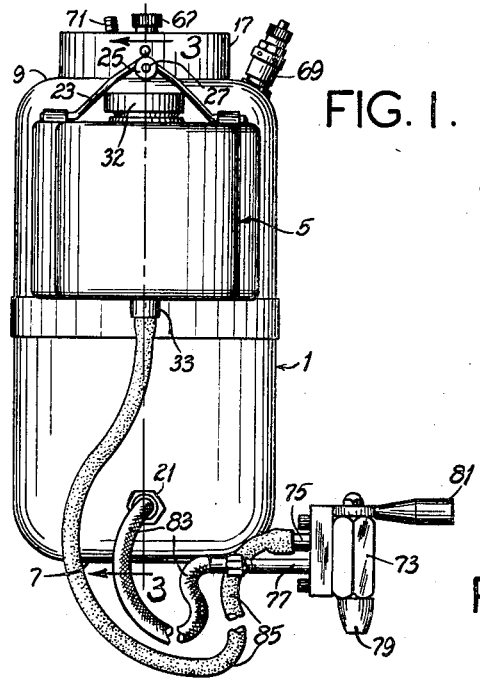
Figure 2:
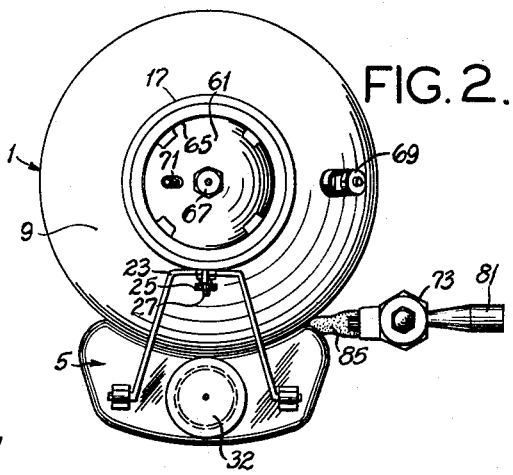
Fig. 2 is a plan view of Fig. 1.
Figure 4:
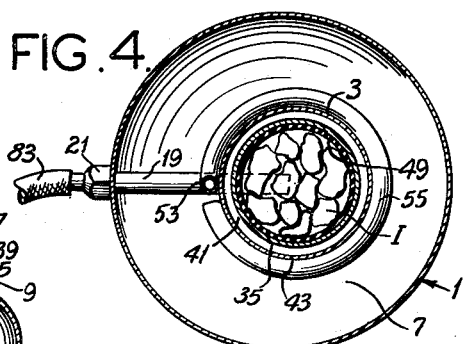
Fig. 4 is a horizontal section taken on line 4—4 of Fig. 3.

Referring to the drawing, a beverage dispenser of the portable type embodying the invention for mixing and dispensing a carbonated beverage is shown to comprise a pressure vessel 1, a refrigerant container 3 for solidified carbon dioxide in the vessel, and a sirup receptacle 5. The vessel 1 constitutes a tank for a quantity of water to be carbonated and for the resultant cold carbonated water supply, the latter to be mixed with sirup from the sirup receptacle 5. Carbon dioxide gas from solidified carbon dioxide I in the container 3 is used to maintain the water carbonated and to maintain dispensing pressure in the vessel 1, and the solidified carbon dioxide acts as a refrigerant for cooling the carbonated water.

The pressure vessel 1 comprises a cylindrical tank, made of sheet metal, such as stainless steel for example, having a bottom 7 and top 9, the latter having a central opening or mouth 11. Surrounding the mouth 11 of the vessel is a flat annular seat 13 for a packing ring or gasket 15, and surrounding the seat is an internally threaded collar 17, this being welded or otherwise suitably secured to the top 9 of the vessel. At 19 is shown a carbonated water outlet pipe. This is located at the bottom of the vessel 1 and leads to a hose coupling 21 on the exterior of the vessel. The sirup receptacle 5 comprises a sheet metal receptacle curved to fit against the side of the vessel 1 and having a bail 23 which is clamped between the collar 17 and a nut 25 threaded on a stud 27 extending outward from the collar. The sirup receptacle may be additionally supported by a bracket 29 on the exterior of the vessel 1, and has a filling opening 31 in its top closed by a plug 32, and an outlet with a hose coupling 33 in its bottom.

Figure 3:
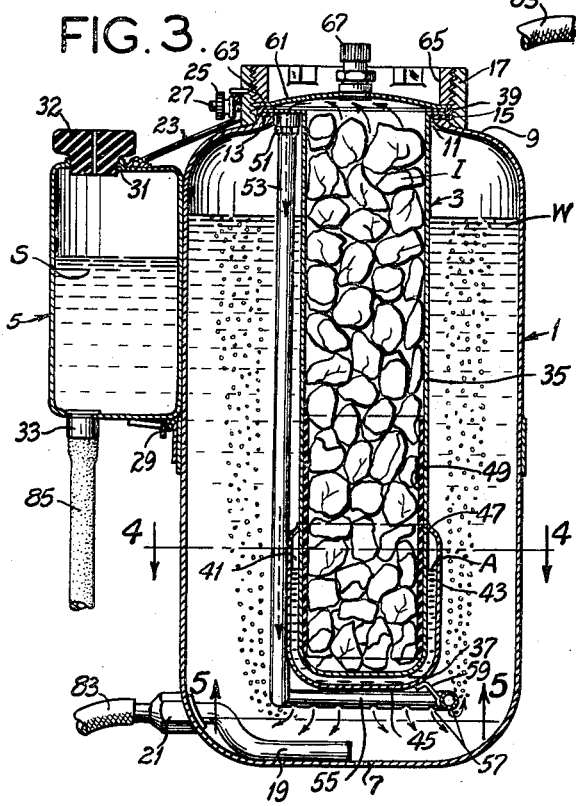
Fig. 3 is an enlarged vertical section taken on line 3—3 of Fig. 1.
Figure 5:
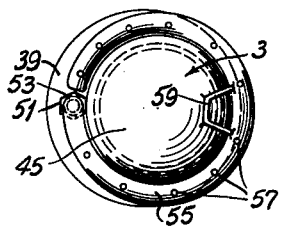
Fig. 5 is a view looking upward from the line 5—5 of Fig. 3.

The container 3 for the solidified carbon dioxide I comprises a thin-walled sheet metal cylinder 35, made of stainless steel, for example, having a bottom 37 and an outwardly extending flange 39 at its upper end. The flange is circular and of such diameter as to seat on the gasket 15 on the seat 13. The cylinder 35 extends down into the vessel for immersion in the water in the vessel, being of lesser height than the height of the vessel so that its lower end is spaced above the bottom 7 of the vessel. The cylinder 35 extends down from the flange 39 in eccentric relation with respect to the flange (and the vessel 1) so that the flange is wider toward one side than toward the other (see Fig. 3, wherein it will be seen that the left part of the flange is wider than the right).

At its lower end within the vessel 1, the container 3 is formed with double walls defining a sealed chamber 41 at the bottom of the container and surrounding the vertical cylindrical wall of the cylinder 35 over a portion of its height. As shown, this chamber 41 is formed by fitting a cup-shaped sheet metal jacket 43 over the lower end of the cylinder 35, with the bottom 45 of the jacket spaced below the bottom of the cylinder and the vetrical cylindrical wall of the jacket spaced outward from the wall of the cylinder, the cylindrical wall of the jacket having an inwardly flanged rim at its upper end as indicated at 47 welded or soldered to the cylinder with a gas-tight seam to seal the chamber 41. As illustrated, about the lower one-fourth of the container 3 is double-walled. A tube 49 of thermal insulating material, such as a plastic, is fitted in the lower end of the container 3 extending at least throughout the double-wall region of the container.

Sealed in and partially filling the chamber 41 is a quantity of a normally liquid heat-transfer agent A having a freezing point below that of carbon dioxide and a boiling point or temperature of vaporization somewhat below the freezing point of fresh water, and above the temperature of the refrigerant. It is also preferable that the agent be such that its vapor pressure is not excessive at about 212° F., to avoid excessive pressure in the chamber 41 if the container is cleaned in boiling water. The desired boiling point for the agent may be established by partially evacuating the chamber 41. The agent, of course, is one which is chemically inactive with respect to the metal of the cylinder 35 and jacket 43 and preferably is relatively non-toxic to avoid harm to consumers in case of leakage of the agent into the vessel 1. An agent particularly suitable for the purpose is acetone, with the chamber 41 partially evacuated to lower the boiling point of the acetone to a temperature of the order of the freezing point of water, for example, from 24° F. to 28° F. In the particular application disclosed herein, this range of the boiling point is adapted to provide for refrigeration to a temperature slightly in excess of the freezing temperature of water, thereby preventing the formation of ice. The arrangement is such that in the double-walled region of the container 3, heat transfer from the liquid in the vessel 1 to the charge in the container 3 occurs by way of heat transfer from the liquid through the jacket 43 to the heat-transfer agent A, causing vaporization of part of the agent, and heat transfer from the vapor through the inner wall to the charge of refrigerant in container 3, causing condensation of the vapor, this cycle continuing as long as the liquid is warm enough to cause vaporization of the agent. The tube 49 is provided to keep the refrigerant in container 3 from direct contact with the cylinder 35 at the region of attachment of the jacket 43 to the cylinder.

At 51 is shown a check valve having its inlet end secured from below in an opening in the wide part of the flange 39. A pipe 53 extends downward from the outlet end of the check valve 51 alongside the container 3. The lower end of the pipe is bent and coiled into a horizontal ring 55 below the bottom of the container 3. The ring 55 is formed with a plurality of outlet apertures 57 and may be braced by a strut 59 extending from the lower end of the container. A domed closure or pressure head 61 is clamped against a packing ring or gasket 63 bearing upon the flange 39 by means of a clamping ring 65 threaded in the collar 17. This seals the vessel 1 and the container 3 against escape of pressure.

The head 61 is domed to provide space for carbon dioxide gas to flow from the container 3 to the inlet of the check valve 51. The latter is adapted to open when the gas pressure in the receptacle 3 exceeds a predetermined pressure (12 p. s. i. for example) for flow of carbon dioxide gas down through the pipe 53 and out through the outlet apertures 57 in the ring 55 at the lower end of the pipe to bubble up through water W in the vessel 1 surrounding the container 3 to carbonate the water.

A gas vent valve 67 is provided on the pressure head 61 in communication with the interior of the container 3 to limit the pressure that may build up therein, for example, to 120 p. s. i. This valve may be made adjustable to vary this limiting pressure if desired. A gas vent valve 69 is provided on the top 9 of the vessel 1 to limit the pressure that may build up in the vessel. This valve is adjustable for setting it to vent the vessel, a typical pressure setting of the valve 67, for example, being 85 p. s. i. Also, a gas valve 71, such as a conventional tire inflating valve, is provided in the head 61 so that carbon dioxide under pressure may be supplied from an external source through the head into the container 3. It will be understood that valve 71 opens under an external pressure, for example 85 p. s. i., and is closed by pressure in the receptacle 3.

At 73 is shown a mixing faucet having a sirup inlet 75, a carbonated water inlet 77, an outlet 79 and a handle 81. This faucet is of the type which mixes and dispenses sirup and carbonated water when its handle is turned to open the faucet. Such faucets are well known in the art. Flexible hose lines 83 and 85 respectively connect the carbonated water outlet coupling 21 of the vessel and the carbonated water inlet 77 of the faucet and the sirup outlet coupling 33 of the sirup receptacle 5 and the sirup inlet 75 of the faucet.

In use, the vessel 1 is filled with water W, the container 3 with cracked solidified carbon dioxide, and the sirup receptacle 5 with sirup S. The container 3 is inserted into the vessel 1 and the pressure head 61 applied and clamped in place. The valve 69 is initially set to hold about the same pressure in the vessel 1 as the valve 67 holds in the container 3 (120 p. s. i. for example). Carbon dioxide gas under a pressure of about 85 p. s. i. is introduced into the container 3 through the valve 71 for rapid carbonation of the water. The water is cooled during this initial carbonation period mainly by heat transfer through the single-walled part of the container 3 above the double-walled part of the container. Carbonation occurs by flow of carbon dioxide gas from the container 3 through the check valve 51, down through the pipe 53, and out through the outlets 57 in the ring 55 at the lower end of the pipe, the gas issuing from the outlets and bubbling up through the water. After the water has been carbonated and cooled, the valve 69 is reset to hold about 90 p. s. i. in the vessel for dispensing.

During the initial carbonating and cooling period, much of the solidified carbon dioxide in the upper part of the container 5 may be used up, inasmuch as there is direct heat transfer from the water through the single-walled part of the container to this part of the charge of solidified carbon dioxide. However, due to the retardation of the rate of heat transfer from the water to the portion of the charge in the lower doubled-wall part of the container, by reason of the vapor-liquid cycle of the heat transfer agent A, this portion of the charge is reserved for keeping the water cold and maintaining it carbonated for a considerable period of time following the termination of the initial carbonating and cooling period. This gives a vendor of drinks ample time to sell the entire contents of the dispenser before the water starts to warm up, even on a hot day.

To dispense a drink, the faucet handle 81 is turned to open the faucet. Pressure in the vessel 1 forces cold carbonated water W out of the vessel through the hose line 83 and the faucet outlet 79. Sirup S flows by gravity from sirup receptacle 5 through hose line 85, and mixes with the carbonated water flowing through the faucet to dispense a mixed cold drink.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

We claim:

1. A cooler comprising a container for a charge of solidified carbon dioxide adapted for immersion in a vessel full of water to cool the water, said container comprising a sheet metal cylinder closed at one end, a sheet metal cup-shaped jacket surrounding the closed end of the cylinder in spaced relation thereto and sealed at its rim to the cylinder to provide a sealed chamber, and a quantity of a normally liquid heat transfer agent sealed in the chamber, said agent, under its sealed condition in the chamber, having a temperature of vaporization of the order of the freezing temperature of water and having a freezing temperature lower than the temperature of solidified carbon dioxide, the thermal insulating material in the cylinder covering the region of the cylinder where the rim of the jacket is sealed to the cylinder.

2. A beverage dispenser comprising a pressure vessel, a container of heat-conductive material for solidified carbon dioxide extending down into the vessel from its top, the container being in communication with the vessel through a check valve which is adapted to open to permit flow of carbon dioxide gas from the container to the vessel, the upper portion of the container being of single-walled construction and the lower part of the container being of double-walled construction providing a sealed chamber surrounding the solidified carbon dioxide in the lower part of the container, and a quanity of a normally liquid heat transfer agent sealed in the chamber, the heat transfer agent, under its sealed condition in the chamber, having a temperature of vaporization of the order of the freezing point of water and having a freezing temperature below the temperature of solidified carbon dioxide.

3. A beverage dispenser comprising a pressure vessel, a container of heat-conductive material for solidified carbon dioxide extending down into the vessel from its top, the container being in communication with the vessel through a check valve which is adapted to open to permit flow of carbon dioxide gas from the container to the vessel, the upper portion of the container being of single-walled construction and the lower part of the container being of double-walled construction providing a sealed chamber surrounding the solidified carbon dioxide in the lower part of the container, and a quantity of acetone sealed in the chamber, the chamber being partially evacuated so that the temperature of vaporization of the acetone is from $+24°$ F. to $+28°$ F.

4. A beverage dispenser comprising a pressure vessel having a mouth in its top, a container for a charge of solidified carbon dioxide in the vessel comprising a sheet metal cylinder extending down into the vessel from its top, the cylinder being open at its upper end and having an outwardly extending flange at its upper end bearing on the top of the vessel around the mouth, and being closed at its lower end, a cup-shaped sheet metal jacket surrounding the closed end of the cylinder in spaced relation thereto and sealed at its rim to the cylinder to provide a sealed chamber, and a quantity of a normally liquid heat transfer agent sealed in the chamber, said agent, under its sealed condition in the chamber, having a temperature of vaporization somewhat lower than the freezing point of water and having a freezing temperature lower than the temperature of solidified carbon dioxide, a removable pressure head closing the upper end of the container and sealing against said flange, a check valve secured in an opening in the flange with its inlet open to the container through a space under the pressure head, and a pipe extending down from the outlet of the valve into the vessel alongside the container and having outlets therein for carbon dioxide gas flowing through the valve from the container to bubble up through the contents of the vessel.

5. In combination, a container for a charge of solidified carbon dioxide comprising a sheet metal cylinder open at one end and closed at its other end, the cylinder having an outwardly extending flange at its open end, a cup-shaped sheet metal jacket surrounding the closed end of the cylinder in spaced relation thereto and sealed at its rim to the cylindrical wall of the cylinder to provide a sealed chamber surrounding part of the cylinder toward its closed end, a quantity of a normally liquid heat transfer agent sealed in the chamber, said agent, under its sealed condition in the chamber, having a temperature of vaporization somewhat lower than the freezing point of water and having a freezing temperature lower than the temperature of solidified carbon dioxide, a check valve secured in an opening in the flange with its inlet opening away from the container, and a pipe fixed at one end to the outlet of the valve and extending alongside the container and having gas outlets at its other end.

6. In combination, a container for a charge of solidified carbon dioxide comprising a sheet metal cylinder open at one end and closed at its other end, the cylinder having an outwardly extending flange at its open end, a cup-shaped sheet metal jacket surrounding the closed end of the cylinder in spaced relation thereto and sealed at its rim to the cylindrical wall of the cylinder to provide a sealed chamber surrounding part of the cylinder toward its closed end, a quantity of acetone sealed in the chamber, the chamber being partially evacuated so that the temperature of vaporization of the acetone is from $+24°$ F. to $+28°$ F., a check valve secured in an opening in the flange with its inlet opening away from the container, and a pipe fixed at one end to the outlet of the valve and extending alongside the container and having gas outlets at its other end.

7. In combination, a container for a charge of solidified carbon dioxide comprising a sheet metal cylinder open at one end and closed at its other end, the cylinder having an outwardly extending flange at its open end, a cup-shaped sheet metal jacket surrounding the closed end of the cylinder in spaced relation thereto and sealed at its rim to the cylindrical wall of the cylinder to provide a sealed chamber surrounding part of the cylinder toward its closed end, a quantity of a normally liquid heat transfer agent sealed in the chamber, said agent, under its sealed condition in the chamber, having a temperature of vaporization somewhat lower than the freezing point of water and having a freezing temperature lower than the temperature of solidified carbon dioxide, a check valve secured in an opening in the flange with its inlet opening away from the container, and a pipe fixed at one end to the outlet of the valve and extending alongside the container and formed at its other end into a ring underlying the container and provided with a plurality of apertures.

8. A beverage dispenser comprising a pressure vessel for containing water, a container of heat-conductive material for solidified carbon dioxide extending down into the vessel from its top, the container being in communication with the vessel for flow of carbon dioxide gas from the container to the vessel, the upper portion of the container being of single-walled construction and the lower part of the container being of double-walled construction providing a sealed chamber surrounding the solidified carbon dioxide in the lower part of the container, and a quantity of a normally liquid heat transfer agent sealed in the chamber, the heat transfer agent, under its sealed condition in the chamber, having a temperature of vaporization somewhat lower than the freezing point of water and having a freezing temperature below the temperature of solidified carbon dioxide.

9. A beverage dispenser as set forth in claim 8 wherein the heat transfer agent is acetone, and the chamber is partially evacuated so that the temperature of vaporization of the acetone as sealed in the chamber is somewhat lower than the freezing point of water.

References Cited in the file of this patent

UNITED STATES PATENTS

| Number | Name | Date |
|---|---|---|
| 1,887,687 | Killeffer | Nov. 15, 1932 |
| 1,921,147 | Baird | Aug. 8, 1933 |
| 1,940,741 | Brewer | Dec. 26, 1933 |
| 1,983,285 | Gloor | Dec. 4, 1934 |
| 2,104,466 | Marzolf | Jan. 4, 1938 |
| 2,104,467 | Marzolf | Jan. 4, 1938 |
| 2,142,569 | Marantette | Jan. 3, 1939 |
| 2,342,221 | Quinn | Feb. 22, 1944 |